Aug. 5, 1958   K. B. MAXWELL   2,846,103
NURSING BOTTLE
Original Filed May 6, 1954
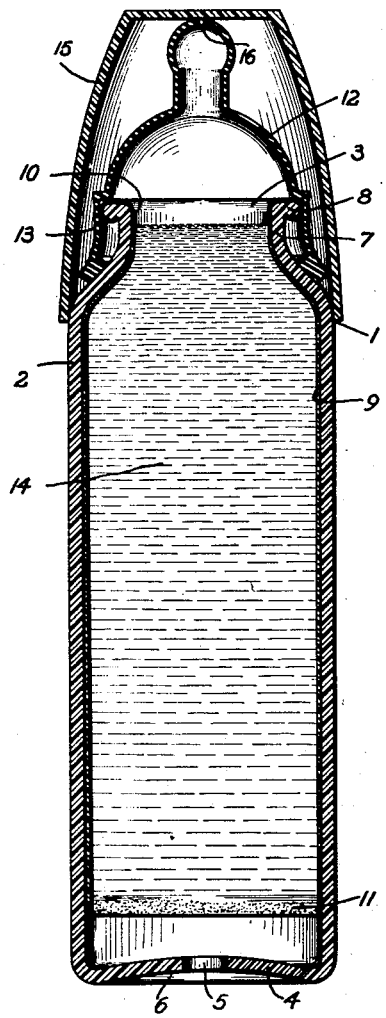
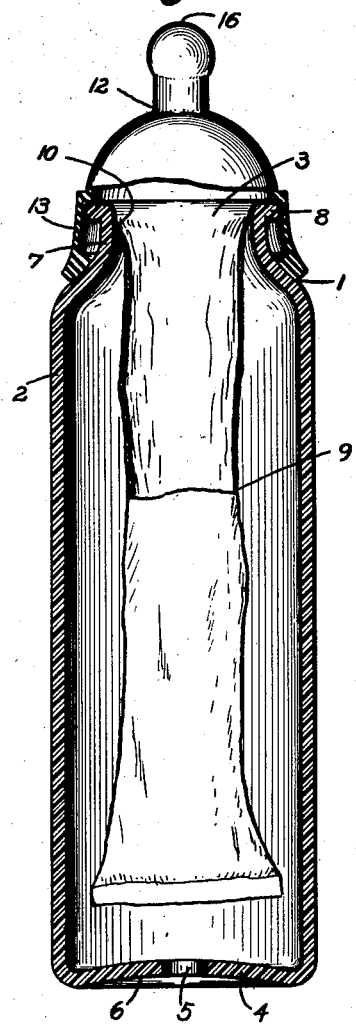
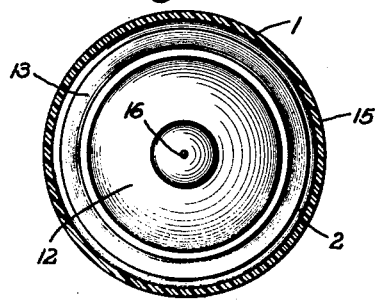
INVENTOR.
Keaton Bruce Maxwell.
BY
Fishburn & Mullendore
ATTORNEYS.

2,846,103

NURSING BOTTLE

Keaton Bruce Maxwell, Kansas City, Mo.

Continuation of application Serial No. 427,955, May 6, 1954. This application December 29, 1954, Serial No. 478,363

1 Claim. (Cl. 215—11)

This invention relates to a nursing bottle, and more particularly to a bottle having a collapsible inner container or sack, and is a continuation of my application on "Nursing Bottle" filed May 6, 1954, Serial No. 427,955, now Patent No. 2,793,778.

So far as I am aware no one has heretofore devised a nursing bottle having an inner container or sack wherein the bottle is provided with openings to allow air to contact the inner container or sack to allow filling of the sack while in the bottle and to allow the milk to be drawn from the bottle by the nursing infant whereby the air surrounding the sack will cause the sack to be collapsed and no air will be contained within the sack and, therefore, no air be drawn into the infant's mouth from the nursing bottle.

It is, therefore, the principal object of the present invention to provide a nursing bottle having a disposable container for the milk wherein air will be emitted from the container of the milk and no air be drawn into the infant's mouth through nursing the bottle.

Other objects of the present invention are to provide an outer container or bottle having at least one opening therein to allow air to enter the bottle when the bottle is covered by a nipple or the like; to provide a bottle having a throat through which a collapsible sack may be inserted and the open top thereof engaged around the open neck of the bottle; to provide a collapsible sack or container which may be disposed of after using; to provide a nipple for the bottle which will engage the open end of the inner container or sack and the open mouth of the bottle and retain the sack therein; to provide a cover for the nipple and upper portion of the bottle to keep the same sterile while the sack is filled with milk and until it is desired to be fed to the infant; and to provide a device of this character, simple and economical to manufacture.

In accomplishing these and other objects of the present invention, I have provided improved details of structure, the preferred forms of which are illustrated in the accompanying drawings, wherein:

Fig. 1 is a vertical cross-sectional view through the bottle showing the collapsible container filled with milk.

Fig. 2 is a vertical cross-sectional view showing the sack in collapsed condition after the milk is drawn therefrom.

Fig. 3 is a top plan view of the device.

Referring more in details to the drawings:

1 designates a nursing bottle embodying the features of my invention consisting of a bottle or the like 2 having an open top 3 and a bottom 4. While I have here shown the bottle to be made of plastic material or the like, any material such as glass or the like may be used.

Applicant has found that in order to fill a container or sack made of flexible material, air must be removed from the bottle while the sack is being filled in order that the inner container may be filled with milk.

I therefore provide an opening 5 in the bottom of the bottle and the bottom being slightly curved upwardly as indicated at 6. I do not wish to be limited to the place of the opening in the bottle as it might be in one side or there could be several openings in the side of the bottle as well as the bottom without changing the spirit of the invention or accomplishing the result desired. The bottle 2 is curved inwardly near the top and has a neck portion 7 and a rim around the periphery as indicated at 8 as is the usual custom.

9 designates a collapsible flexible container made of a suitable material which may be disposed of after one use thereof. The flexible container or sack has a neck portion 10 and the bottom is sealed together as indicated at 11. The open neck portion has its ends folded over and tucked around the rim 8 of the bottle. A nipple 12 is then adapted for placement over the open top of the bottle and has a portion 13 which engages the rim 8 of the bottle and seals the neck of the collapsible container to the rim to prevent milk from leaking from the bottle.

Before the nipple is placed on the bottle the collapsible container 9 may be inserted within the bottle proper and the open rim secured to the rim 8 of the bottle. The milk as indicated at 14 may then be poured into the container. Unless the air is evacuated from the bottle, it is impossible to fill the inner container 9 with milk. Therefore, it is necessary to provide for the air to be removed from the bottle while filling the container and that is provided through the opening in the bottom of the bottle. The nipple has the usual opening 16 in the top thereof for removal of milk by the infant. After the inner container is filled and the nipple placed on the bottle the cap 15 may be placed thereover to keep the nipple sterile until it is desired to be used.

It will be noted the container 9 is filled to substantially the top so that no air is contained within the container, and the only air which the infant might draw would be that small amount in the nipple above the container.

It will further be noted as the milk is drawn from the container the air in the bottle will cause the container to follow the milk as it is taken therefrom and thereby causing the container to collapse as the milk is drawn therefrom and thus preventing air from entering through the nipple so that the infant will not at any time obtain air from nursing the bottle. The air which enters the bottle will keep the container collapsed so that no air can accumulate therein.

It will be obvious from the foregoing that I have provided an improved nursing bottle wherein the inner container may be filled with milk to the fullest extent thereof because of air being admitted from the bottle during the filling and during nursing of the bottle by the infant, air will enter the bottle to keep the tube collapsed to prevent air from entering the milk container so that the infant will not draw air from the bottle to any appreciable extent.

What I claim and desire to secure by Letters Patent is:

A nursing bottle assembly comprising, a bottle having a bottom wall and an upstanding side wall thereon terminating in a neck portion at the upper end with an open top, an annular rib on said neck portion, a disposable collapsible bag-like container of thin flexible material and having a closed bottom and an open top, said bag-like container being positioned in the bottle with the portions of said bag-like container adjacent the open top being turned outwardly and downwardly and engaging over the annular rib on the neck portion, said bag-like container being adapted to hold a supply of milk, said bag-like container being substantially the length of the bottle and expansible whereby when filled the bottom and sides of said container are supported on the bottom wall and side walls respectively of the bottle, and a nipple having a body portion for engaging the bag-like container portion overlying the annular rib for securing said container to the bottle and closing the upper end thereof to seal the milk therein, said bottle bottom wall having an aperture therein for escape of air from said bottle around the bag-like container to allow filling of the container with milk and for admission of air into the bottle around said container for collapsing said container as milk is drawn therefrom through the nipple and preventing air from entering the container and thence drawn into an infant's mouth through the nipple.

References Cited in the file of this patent

UNITED STATES PATENTS

| | | |
|---|---|---|
| 1,037,309 | Poore | Sept. 3, 1912 |
| 1,938,052 | Speir | Dec. 5, 1933 |
| 2,133,411 | Zohe | Oct. 18, 1938 |
| 2,624,485 | Boston | Jan. 6, 1953 |